(12) United States Patent  (10) Patent No.: US 8,210,007 B1
Laracy  (45) Date of Patent: Jul. 3, 2012

(54) METHOD OF PREVENTING TRAILER THEFT

(76) Inventor: Frederick J. Laracy, East Weymouth, MA (US)

( * ) Notice: Subject to any disclaimer, the term of this patent is extended or adjusted under 35 U.S.C. 154(b) by 0 days.

(21) Appl. No.: 12/661,694

(22) Filed: Mar. 23, 2010

(51) Int. Cl.
*B60R 25/00* (2006.01)

(52) U.S. Cl. ............. 70/226; 70/209; 70/259; 70/432; 70/14; 188/32; 280/402

(58) Field of Classification Search .......... 70/14, 58, 70/201, 203, 209, 225–227, 238, 259, 432; 188/32; 280/402, 507
See application file for complete search history.

(56) References Cited

U.S. PATENT DOCUMENTS

| | | | | |
|---|---|---|---|---|
| 986,296 A | * | 3/1911 | Kavanagh | 116/2 |
| 1,307,161 A | * | 6/1919 | Stubblefield | 70/226 |
| 1,401,971 A | * | 1/1922 | Faison | 70/15 |
| 1,504,220 A | * | 8/1924 | Degen | 70/227 |
| 4,878,366 A | * | 11/1989 | Cox | 70/14 |
| 5,475,995 A | * | 12/1995 | Livingston | 70/259 |
| 5,638,710 A | * | 6/1997 | Howard et al. | 70/259 |
| 5,724,839 A | | 3/1998 | Thering | |
| 5,765,414 A | * | 6/1998 | Yu | 70/209 |
| 5,787,742 A | | 8/1998 | Lewis et al. | |
| 5,899,101 A | | 5/1999 | West | |
| 6,796,154 B2 | | 9/2004 | Gebow et al. | |
| 6,829,914 B2 | | 12/2004 | Bullock | |
| D508,645 S | | 8/2005 | Maar | |
| 6,941,780 B1 | | 9/2005 | Marr | |
| D519,825 S | | 5/2006 | Maar | |
| 7,909,234 B2 | * | 3/2011 | Maistrellis | 229/67.4 |
| 2007/0261281 A1 | * | 11/2007 | Roberge | 40/600 |
| 2009/0145180 A1 | * | 6/2009 | Yu | 70/209 |

* cited by examiner

*Primary Examiner* — Suzanne Barrett

(57) ABSTRACT

A method of preventing trailer theft includes the extending of a first end of a rod through a pair of wheels of a trailer. A stop is attached to a second end of the rod to prevent the second end from being pulled through the wheels. The stop has an outer surface has indicia thereon indicating the wheels cannot be rotated. A securing member is extended through the rod adjacent to the first end to prevent the first end from being removed from the wheels.

5 Claims, 5 Drawing Sheets

METHOD OF PREVENTING TRAILER THEFT

BACKGROUND OF THE DISCLOSURE

Field of the Disclosure

The disclosure relates to theft prevention devices and more particularly pertains to a new theft prevention device for preventing the theft of a trailer.

SUMMARY OF THE DISCLOSURE

An embodiment of the disclosure meets the needs presented above by generally comprising the extending of a first end of a rod through a pair of wheels of a trailer. A stop is attached to a second end of the rod to prevent the second end from being pulled through the wheels. The stop has an outer surface has indicia thereon indicating the wheels cannot be rotated. A securing member is extended through the rod adjacent to the first end to prevent the first end from being removed from the wheels.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
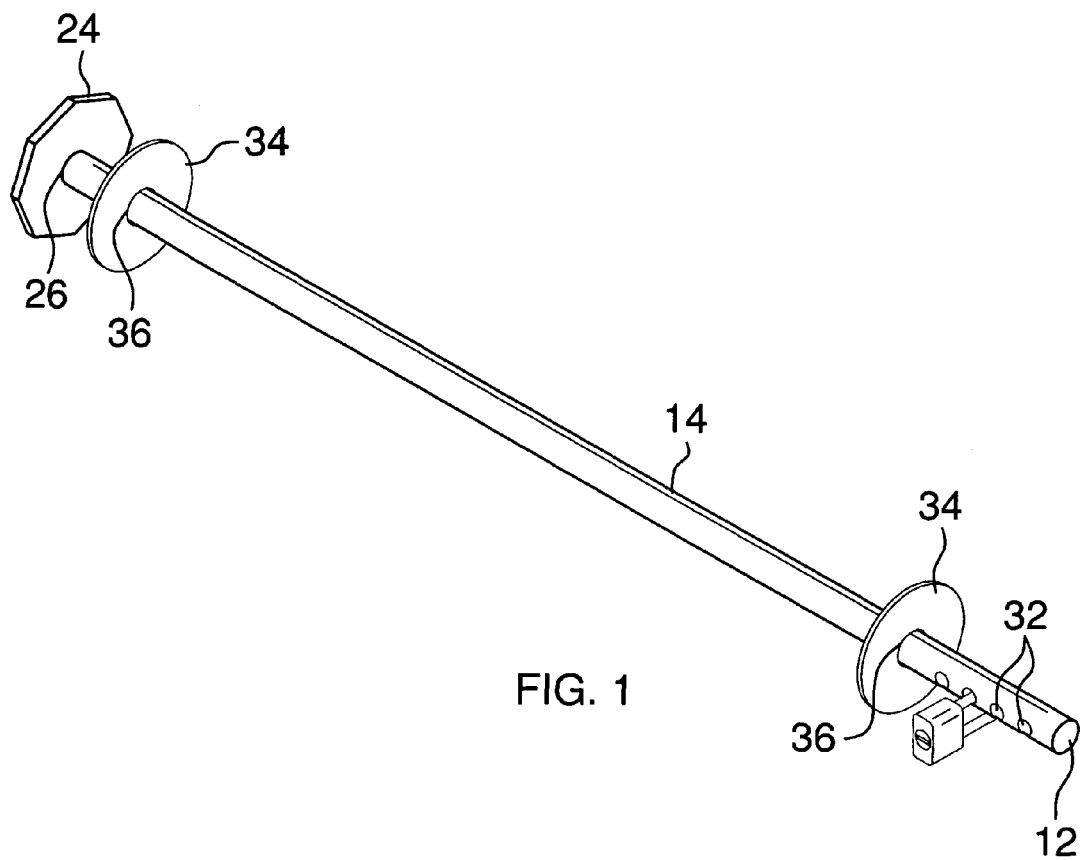
FIG. 1 is a top perspective view of a rod of a method of preventing trailer theft according to an embodiment of the disclosure.
Figure 2:
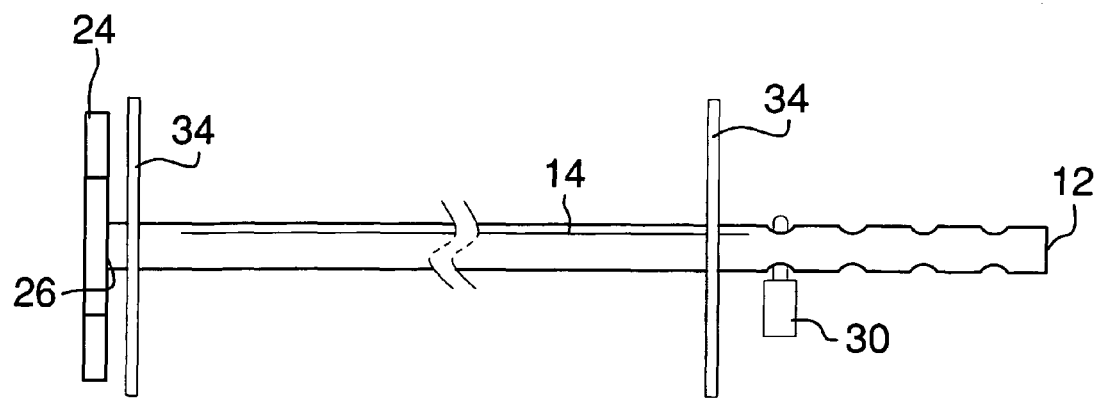
FIG. 2 is a front view of an embodiment of the disclosure.
Figure 3:
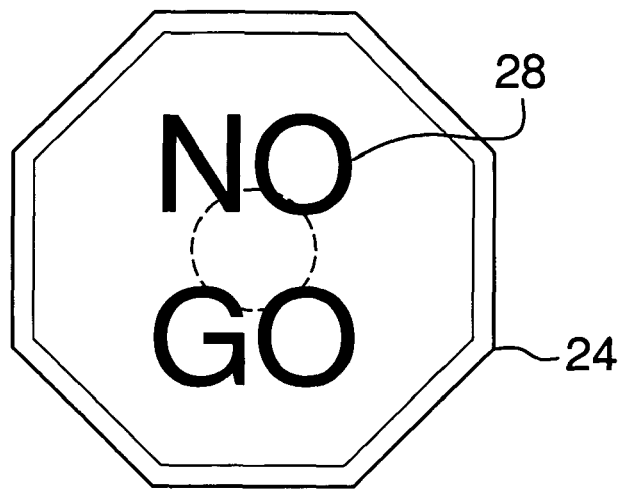
FIG. 3 is an end view of an embodiment of the disclosure.
Figure 4:
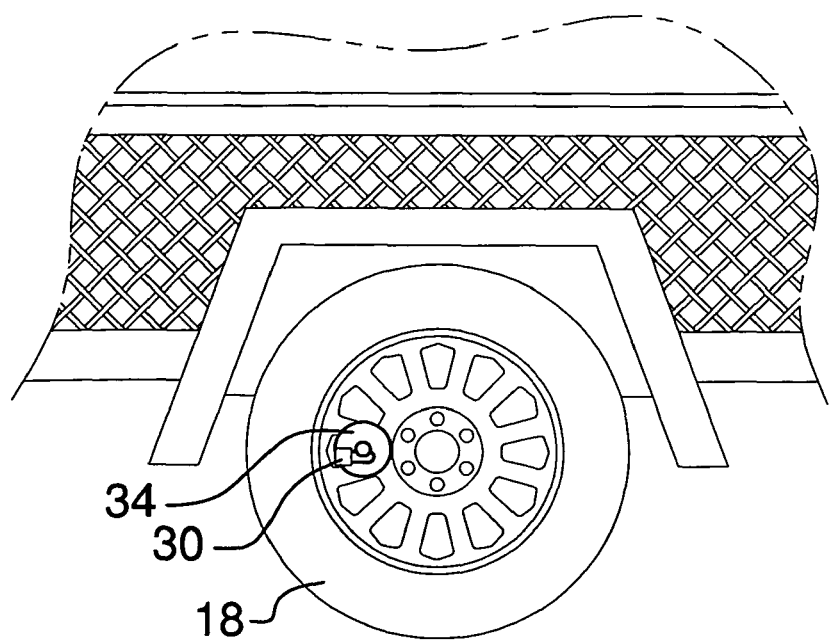
FIG. 4 is a side view of an embodiment of the disclosure.

With reference now to the drawings, and in particular to FIGS. 1 through 7 thereof, a new theft prevention device embodying the principles and concepts of an embodiment of the disclosure and generally designated by the reference numeral 10 will be described.

As best illustrated in FIGS. 1 through 7, the method of preventing trailer theft 10 generally comprises the extending of a first end 12 of a rod 14 through a pair of wheels 18, 20 of a trailer 22. A stop 24 is attached to a second end 26 of the rod 14 to prevent the second end 26 from being pulled through the wheels 18, 20. The stop 24 has an outer surface having indicia 28 thereon indicating the wheels 18, 20 cannot be rotated. This will help to warn anyone from trying to pull the trailer 22 which would result in damage to the wheels 18, 20, and in particular the rims and wheel mounts of the wheels 18, 20, when the rod 14 is in place.

Figure 5:
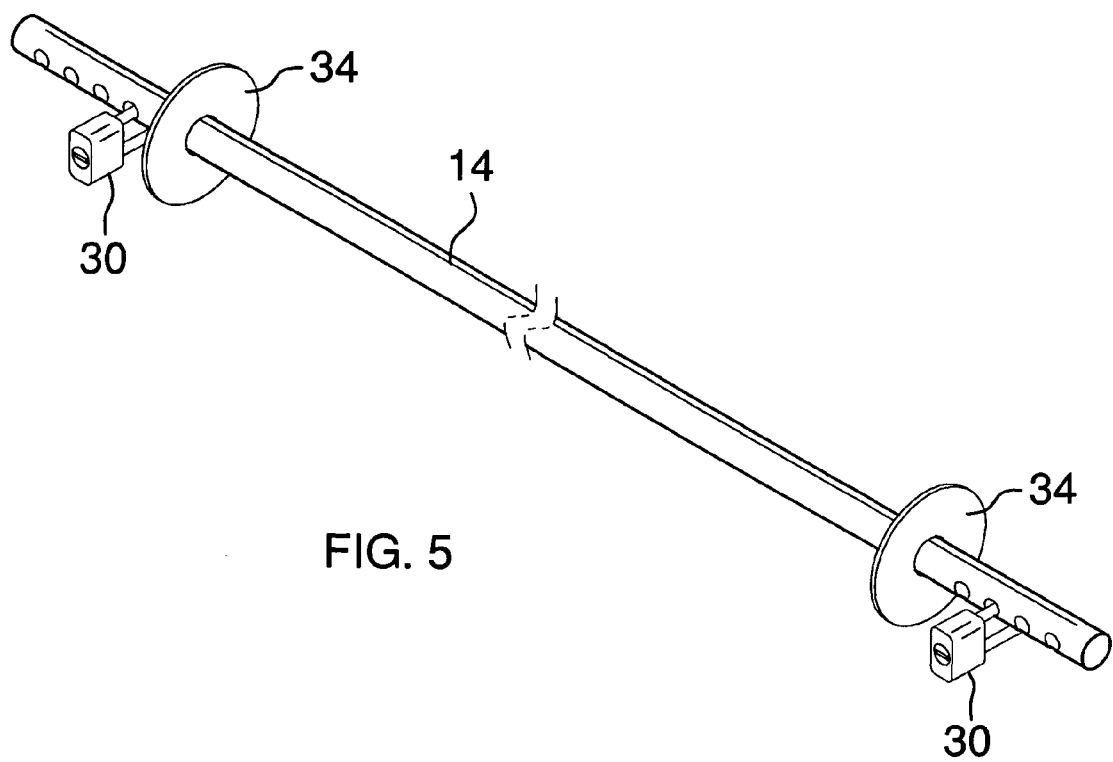
FIG. 5 is a top perspective view of an embodiment of the disclosure.
Figure 6:
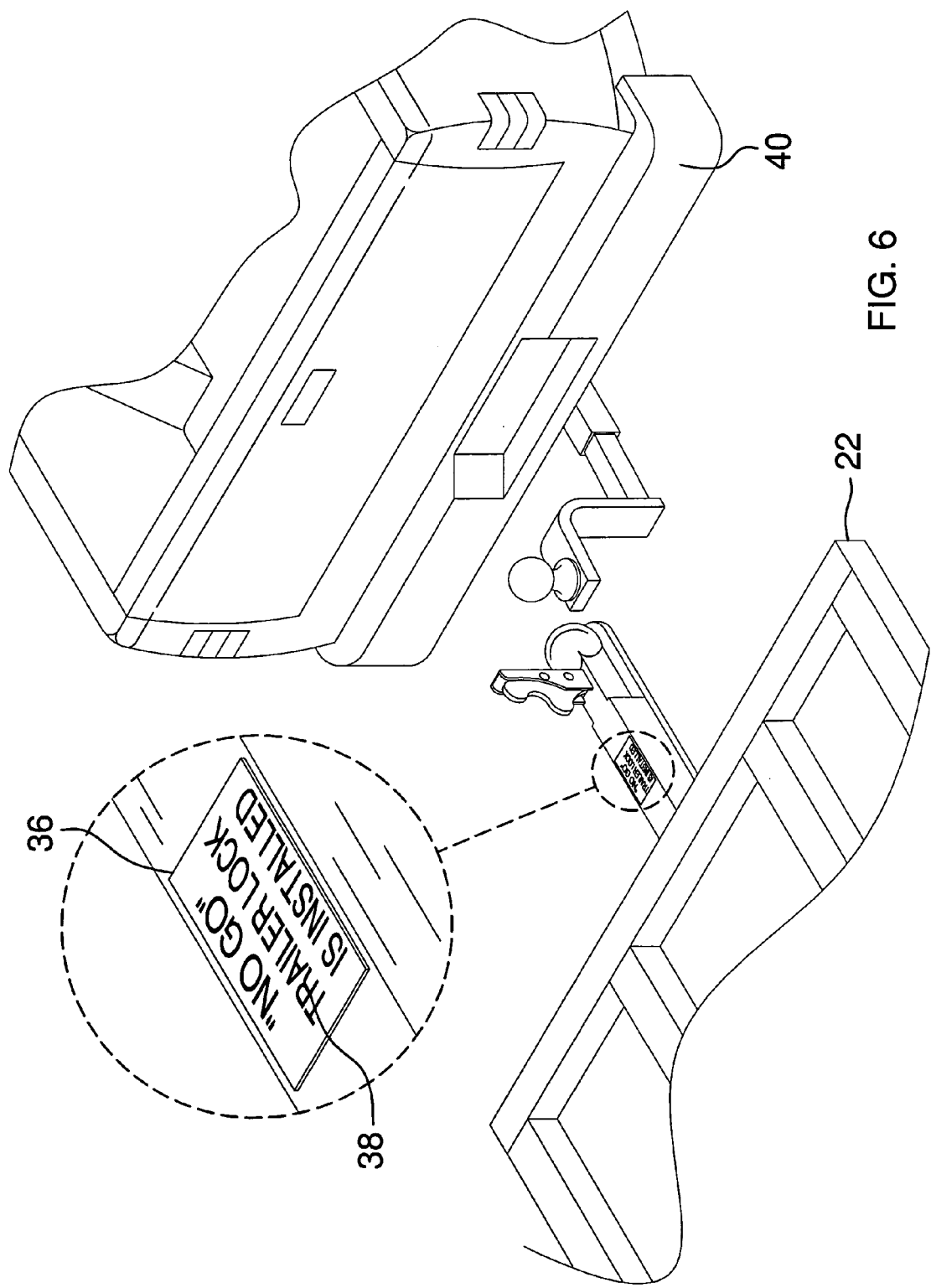
FIG. 6 is a top perspective view of an embodiment of the disclosure.
Figure 7:
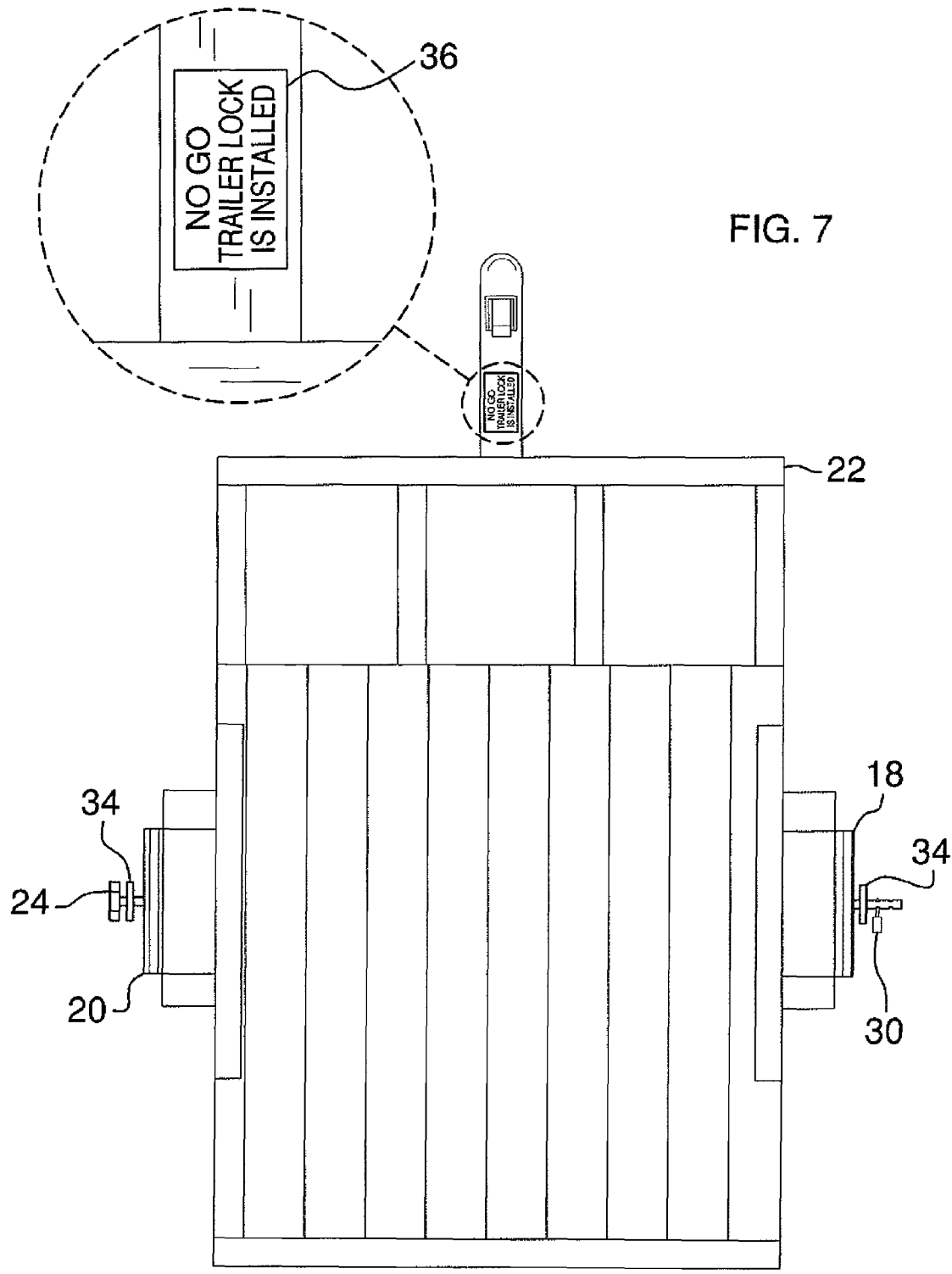
FIG. 7 is a top view of an embodiment of the disclosure.

A securing member 30 is extended through the rod 14 adjacent to the first end 12 to prevent the first end 12 from being removed from the wheels 18, 20. The rod 14 has a plurality of apertures 32 extending therethrough adjacent to the first end 12. The apertures 32 are aligned with each other. The securing member 30 is removably extended through a selected one of the apertures 32. The securing member 30 may comprise a padlock that has a size great enough to prevent it from being pulled through the wheels 18, 20. FIG. 5 shows another embodiment which does not include a stop 24 but which instead includes a pair of securing members 30.

Rim protectors 34 are positioned on the rod 14 to prevent marring of the wheels 18, 20. Each of the rim protectors 34 comprises a panel that has an opening 36 extending therethrough. The rod 14 extends through each of the openings 36. One of the rim protectors 34 is positioned between the stop 24 and one of the wheels 20 and one of the rim protectors 34 is positioned between the securing member 30 and another one of the wheels 18. Each of the rim protectors 34 comprises a resiliently compressible material such as an elastomer.

A label 36 is attached to the trailer 22 which has indicia 38 thereon indicating that the rod 14 is extended through the wheels 18, 20. This will prevent a person from accidentally attaching the trailer 22 to a vehicle 40 hitch and pulling the trailer 22 while the rod 14 is extended through the wheels 18, 20. The label 36 is comprised of a magnetic material and is magnetically attached to the trailer 22, though an adhesive may also be used. The label 36 may be positioned on a hitch of the trailer 22.

In use, the rod 14 is extended through the wheels 18, 20 as stated above. Once the rod 14 is in place, the wheels 18, 20 cannot rotate to allow the movement of the trailer 22. When the trailer 22 is to be used, the securing member 30 is removed, and the rod 14 removed from the wheels 18, 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A method of preventing the theft of a trailer, said method including the steps of:
    extending a first end of a rod through a pair of wheels of a trailer, a stop being attached to a second end of said rod to prevent said second end from being pulled through said wheels, said stop having an outer surface having indicia thereon indicating said wheels cannot be rotated; and
    extending a securing member through said rod adjacent to said first end to prevent said first end from being removed from said wheels; and positioning rim protectors on said rod to prevent marring of said wheels, each of said rim protectors comprising a panel having an opening extending therethrough, said rod extending through each of said openings, one of said rim protectors being positioned between said stop and one of said wheels and one of said rim protectors being positioned between said securing member and another one of said wheels, each of said rim protectors comprising a resiliently compressible material.

2. The method according to claim 1, wherein the step of extending said securing member through said rod includes the step of said rod having a plurality of apertures extending therethrough adjacent to said first end and being aligned with each other, said securing member being removably extended through a selected one of said apertures.

3. The method according to claim 1, further including the step of attaching a label to said trailer, said label having indicia thereon indicating that said rod is extended through said wheels.

4. The method according to claim 3, wherein the step of attaching said label to said trailer further includes said label being comprised of a magnetic material and being magnetically attached to said trailer.

5. A method of preventing the theft of a trailer, said method including the steps of:

extending a first end of a rod through a pair of wheels of a trailer, a stop being attached to a second end of said rod to prevent said second end from being pulled through said wheels, said stop having an outer surface having indicia thereon indicating said wheels cannot be rotated;

extending a securing member through said rod adjacent to said first end to prevent said first end from being removed from said wheels, said rod having a plurality of apertures extending therethrough adjacent to said first end and being aligned with each other, said securing member being removably extended through a selected one of said apertures;

positioning rim protectors on said rod to prevent marring of said wheels, each of said rim protectors comprising a panel having an opening extending therethrough, said rod extending through each of said openings, one of said rim protectors being positioned between said stop and one of said wheels and one of said rim protectors being positioned between said securing member and another one of said wheels, each of said rim protectors comprising a resiliently compressible material; and attaching a label to said trailer having indicia thereon indicating that said rod is extended through said wheels, said label being comprised of a magnetic material and being magnetically attached to said trailer.

\* \* \* \* \*